US008723455B2

(12) United States Patent
Mullet et al.

(10) Patent No.: US 8,723,455 B2
(45) Date of Patent: May 13, 2014

(54) QUICK CHANGE BATTERY ARRANGEMENT FOR MOTORIZED SHADE

(75) Inventors: Willis Jay Mullet, Gulf Breeze, FL (US); Richard Scott Hand, Pace, FL (US); Darrin W. Brunk, Pensacola, FL (US)

(73) Assignee: Homerun Holdings Corporation, Pensacola, FL (US)

( * ) Notice: Subject to any disclaimer, the term of this patent is extended or adjusted under 35 U.S.C. 154(b) by 0 days.

(21) Appl. No.: 13/455,782

(22) Filed: Apr. 25, 2012

(65) Prior Publication Data

US 2013/0285580 A1 Oct. 31, 2013

(51) Int. Cl.

*H02P 1/54* (2006.01)
*H02P 5/00* (2006.01)
*H02P 5/46* (2006.01)

(52) U.S. Cl.

USPC ............. 318/34; 318/139; 318/265; 318/286; 160/84.02; 160/131; 160/133; 160/309; 160/310

(58) Field of Classification Search

USPC ......... 318/34, 139, 265, 286; 160/84.02, 131, 160/133, 309, 310

See application file for complete search history.

(56) References Cited

U.S. PATENT DOCUMENTS

| | | | | |
|---|---|---|---|---|
| 4,022,105 | A | 5/1977 | White | |
| 4,102,242 | A | 7/1978 | Liedke | |
| 5,274,499 | A | 12/1993 | Shopp | |
| 5,547,008 | A | 8/1996 | Sullivan | |
| 5,566,736 | A | 10/1996 | Crider et al. | |
| 6,371,192 | B1 | 4/2002 | Anderson et al. | |
| 6,446,693 | B1 * | 9/2002 | Anderson et al. | 160/168.1 P |
| 6,736,186 | B2 * | 5/2004 | Anderson et al. | 160/168.1 P |
| 6,971,202 | B2 | 12/2005 | Bender | |
| 6,979,962 | B2 * | 12/2005 | Cavarec et al. | 318/9 |
| 7,389,806 | B2 | 6/2008 | Kates | |
| 8,299,734 | B2 | 10/2012 | Mullet et al. | |
| 8,371,358 | B1 | 2/2013 | Mullet et al. | |
| 2006/0086874 | A1 * | 4/2006 | Habel et al. | 248/268 |
| 2012/0031571 | A1 | 2/2012 | Mullet et al. | |
| 2012/0225340 | A1 | 9/2012 | Mullet et al. | |
| 2012/0255689 | A1 * | 10/2012 | Blair et al. | 160/331 |

OTHER PUBLICATIONS

International Search Report and Written Opinion dated Jun. 14, 2013 in the name of HomeRun Holdings Corporation.

* cited by examiner

*Primary Examiner* — Erick Glass
(74) *Attorney, Agent, or Firm* — Baker & Hostetler LLP

(57) ABSTRACT

The present invention advantageously provides a motorized roller shade that includes a shade conduit having an outer surface upon which a shade is attached and an inner surface defining an inner cavity. The motorized shade also comprises a motor disposed within the inner cavity along with a controller coupled to the motor that controls the motor. The motorized roller further comprises a power supply sleeve having an interior space, wherein the power supply sleeve is disposed within the inner cavity, wherein the power supply sleeve is coupled to the motor. The sleeve may be accessed by an access port that extends between the outer surface and the inner surface.

20 Claims, 12 Drawing Sheets

QUICK CHANGE BATTERY ARRANGEMENT FOR MOTORIZED SHADE

FIELD OF THE INVENTION

The present invention relates to a motorized shade. Specifically, the present invention relates to an access port design for the ease of insertion and removal of a power source for a motorized shade or blind.

BACKGROUND OF THE INVENTION

One omnipresent form of window treatment is the roller shade. A common window covering during the 19$^{th}$ century, a roller shade is simply a rectangular panel of fabric, or other material, that is attached to a cylindrical, rotating tube. The shade tube is mounted near the header of the window such that the shade rolls up upon itself as the shade tube rotates in one direction, and rolls down to cover the a desired portion of the window when the shade tube is rotated in the opposite direction.

Oftentimes a control system is mounted at one end of the shade tube which can secure the shade at one or more positions along the extent of its travel, regardless of the direction of rotation of the shade tube. Simple mechanical control systems include ratchet-and-pawl mechanisms, friction brakes, clutches, etc. To roll the shade up and down, and to position the shade at intermediate locations along its extend of travel, ratchet-and-pawl and friction brake mechanisms require the lower edge of the shade to be manipulated by the user, while clutch mechanisms include a control chain that is manipulated by the user.

As roller shade designs evolved, motor powered shades were desired. Motorization of the roller shade was accomplished, in one example, by replacing the simple, mechanical control system with an electric motor that is directly coupled to the shade tube. The motor may be located inside or outside the shade tube, is fixed to the roller shade support and is connected to a simple switch, or, in more sophisticated applications, to a radio frequency (RF) or infrared (IR) transceiver, that controls the activation of the motor and the rotation of the shade tube.

Many known motorized roller shades provide power, such as 120 VAC, 220/230 VAC 50/60 Hz, etc., to the motor and control electronics from the facility in which the motorized roller shade is installed. Recently-developed battery-powered roller shades provide installation flexibility by removing the requirement to connect the motor and control electronics to facility power. The batteries for these roller shades can be mounted within, above, or adjacent to the shade mounting bracket, headrail or fascia. Unfortunately, these battery-powered systems suffer from many drawbacks, including, for example, requiring the end user to dissemble the roller shade to insert or replace the batteries. Accordingly, there is need for battery powered systems wherein the batteries may be replaced without dissembling the roller shade or removing the roller shade from its installation positioning.

SUMMARY OF THE INVENTION

Embodiments of the present invention advantageously provide a motorized roller shade, comprising a shade conduit having an outer surface upon which a shade is attached and an inner surface defining an inner cavity; a motor disposed within said inner cavity, said motor unit drives said shade conduit; a controller coupled to said motor that controls said motor; a power supply sleeve having an interior space, wherein said power supply sleeve is disposed within said inner cavity, wherein said power supply sleeve is coupled to said motor; and an access port that extends between said outer surface and said inner surface, wherein said access port provides access to said interior space of said power supply sleeve.

Other embodiments of the present invention provide an internal power unit for a motorized shade that is accessible when the motorized shade installed for use, comprising: a power supply sleeve having and outer surface and an inner surface that define an interior space, wherein said power supply sleeve is disposed within a shade conduit of the motorized shade; an access port that extends between said outer surface and said inner surface, wherein said access port provides access to said interior space of said power supply sleeve; and a door that enables the access port to be opened or closed.

Further embodiments of the present invention provide a motorized roller shade, comprising: a shade conduit having an outer surface upon which a shade is attached and an inner surface defining an inner cavity; a motor disposed within said inner cavity, said motor unit drives said shade conduit; a battery tube for housing at least one battery disposed in said inner cavity and coupled to said battery; an access port that extends between said outer surface and said inner surface, that allows for said at least one battery to inserted or removed from said battery tube.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
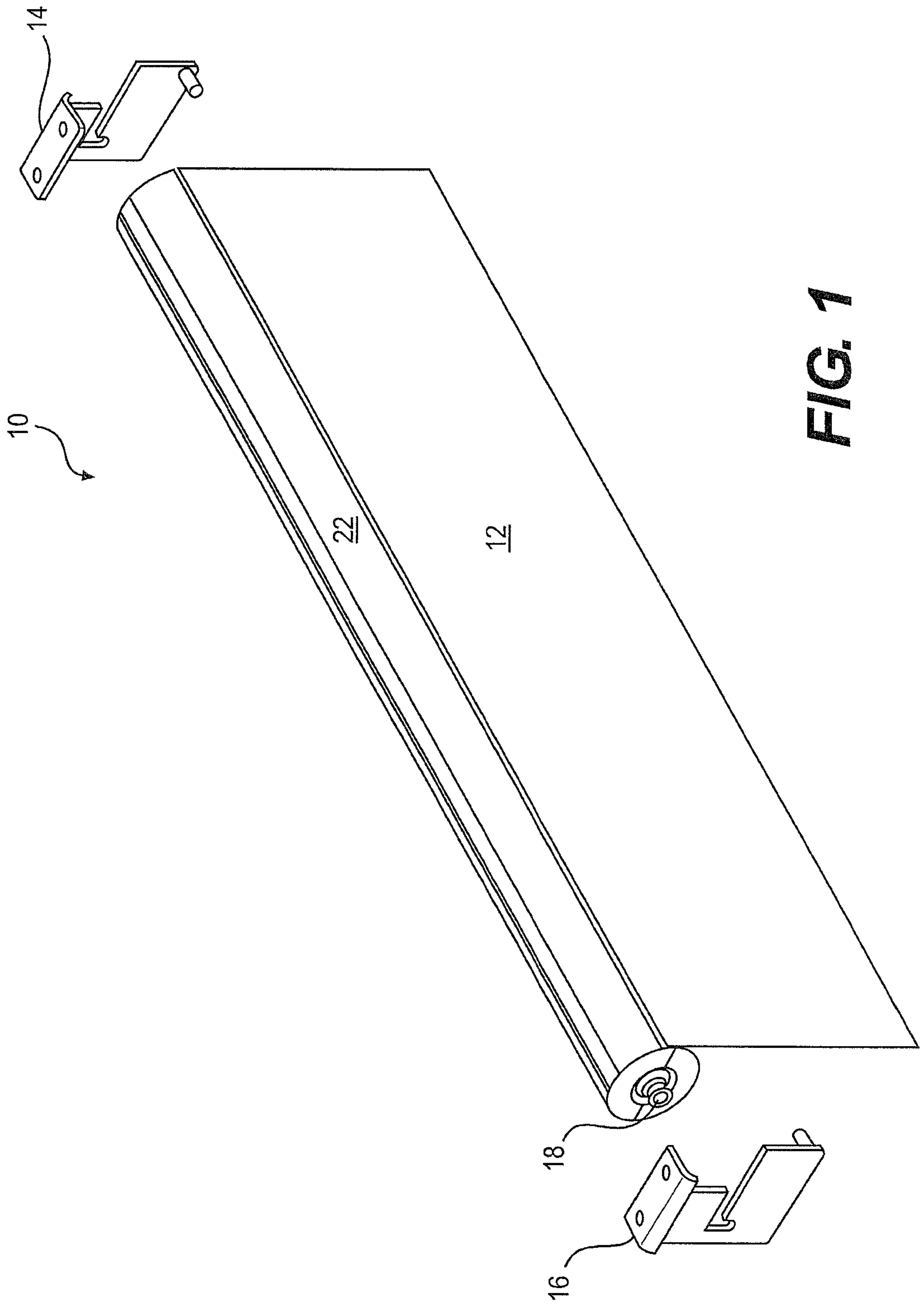
FIG. 1 is an isometric view of a motorized shade assembly, in accordance with an embodiment of the present invention.

The invention will now be described with reference to the drawing figures, in which like reference numerals refer to like parts throughout. The term "shade" as used herein describes any flexible material, such as a shade, a curtain, a screen, etc., that can be deployed from, and retrieved onto, a storage tube.

Embodiments of the present invention provide a motorized roller shade in which the batteries (similar power source), DC gear motor, control circuitry are entirely contained within a shade tube which is supported by bearings. The batteries may be installed or replaced without removing the shade assembly from the installed position or requiring disassembly of the shade assembly. Two support shafts are attached to respective mounting brackets, and the bearings rotatably couple the shade tube to each support shaft. The output shaft of the DC gear motor is fixed to one of the support shafts, while the DC gear motor housing is mechanically coupled to the shade tube. Accordingly, operation of the DC gear motor causes the motor housing to rotate about the fixed DC gear motor output shaft, which causes the shade tube to rotate about the fixed DC gear motor output shaft as well. Because these embodiments do not require external wiring for power or control, great flexibility in mounting, and re-mounting, the motorized roller shade is provided.

Encapsulation of the motorization and control components within the shade tube, combined with the performance of the bearings and enhanced battery capacity of the DC gear motor configuration described above, greatly increases the number of duty cycles provided by a single set of batteries and provides a highly efficient roller shade. Additionally, encapsulation advantageously prevents dust and other contaminants from entering the electronics and the drive components.

Turning now to the figures wherein like reference numerals refer to like parts FIG. 1 illustrates a motorized roller shade assembly, generally designated 10 having a standard payout wherein it deploys a shade 12. As illustrated in FIG. 1, the shade assembly includes end brackets 14, 16, allowing for the motorized roller shade assembly 10 to be mounted near the top portion of a window, door, etc., or any opening to be covered. Also as depicted in FIG. 1, the roller shade assembly 10 includes two support shafts, 18 and 20 (not illustrated in FIG. 1) are attached to the respective mounting brackets 14, 16.

Figure 2:
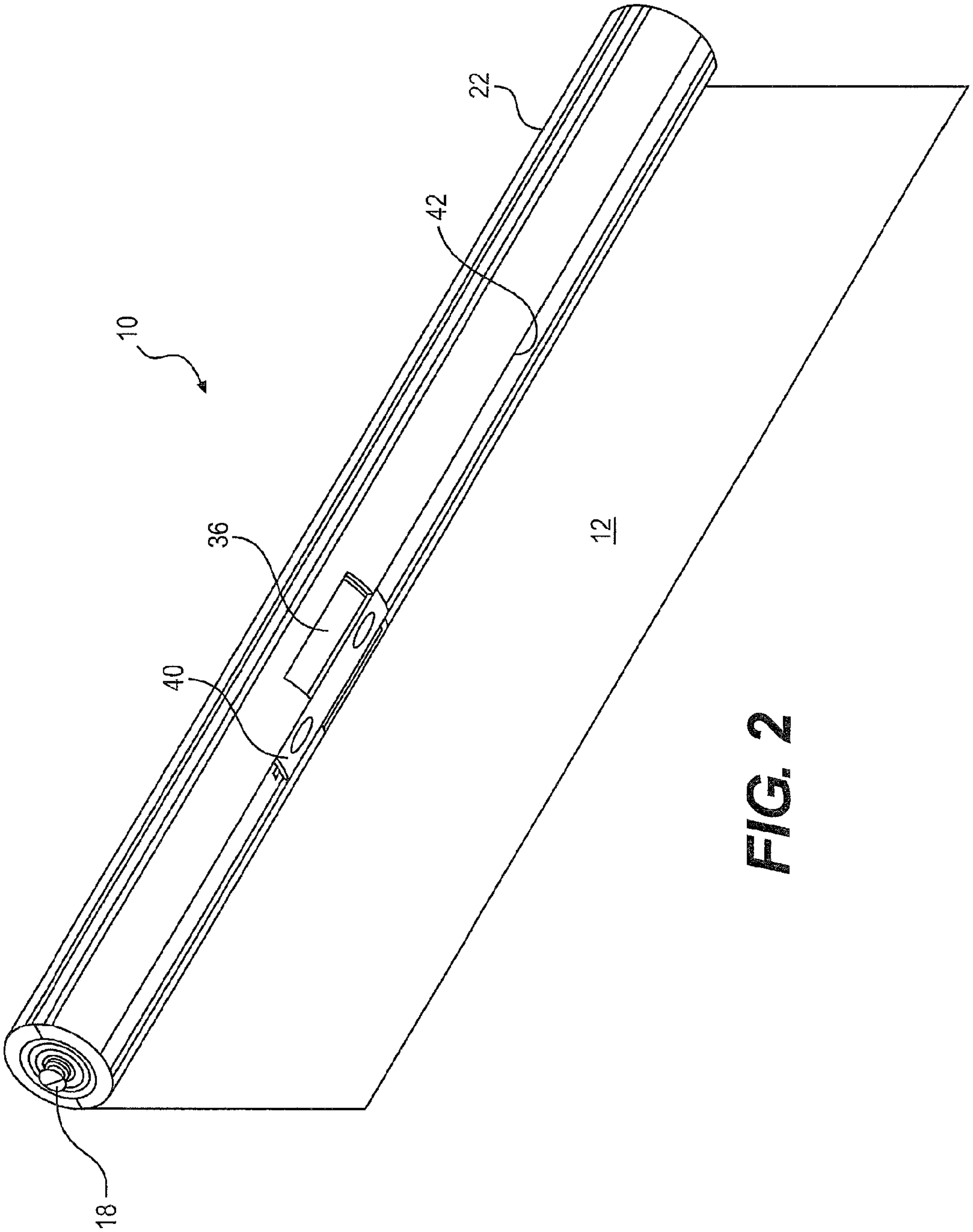
FIG. 2 is an isometric view of the motorized roller shade assembly depicted in FIG. 1 at from the reverse bottom perspective, in accordance with an embodiment of the present invention.

Turning now to FIGS. 1 and 2, as depicted, the motorized roller shade assembly 10 additionally includes a motorized tube assembly 22. In one preferred embodiment, generally, the motorized roller shade assembly 10 includes the tube assembly 22 which stores the motor 24, motor control system 26, motor power source unit or battery sleeve 28, counter balance system 30 and end caps 32, 34. As discussed in more detail below, in preferred embodiments, all of the components necessary to power and control the operation of the motorized roller shade assembly 10 are advantageously located within motorized tube assembly 22.

FIGS. 2-5 depict the motorized roller shade assembly 10, according to one embodiment of the present invention. The motorized roller shade assembly 10 comprises the tube assembly 22 housing the motor 27 and controller unit 26 and power source or battery sleeve 28, preferably at least one battery 38 or the like. While one battery 38 may be utilized, one preferred embodiment employs four (4) "D" sized batteries. In such embodiments, the batteries are housed, as previously mentioned, in a battery sleeve or conduit 28 (as illustrated in FIGS. 4-7). The motor 27 and controller unit 26 and battery sleeve 28 as depicted are located within an inner cavity of the tube assembly 22 defined by the inner surface of shade tube as previously discussed. As illustrated in FIGS. 2-5, the tube assembly 22 has an opening, access or port or slot 36 to that enables the end user to access the battery sleeve 28 and insert and remove batteries 38 from the sleeve 28 housed in the tube assembly 22. The aforementioned access door or slot 36 is exposed when the shade 12 of the motorized roller shade assembly 10 is fully deployed as illustrated in FIG. 2. In one embodiment, the port or slot 36 includes a sliding door 40 and bump stop 42. During normal operation of the motorized roller shade assembly 10, e.g., raising, storing and/or lowering the shade 12, the shade 12 covers the opening 36, by way of sliding door 40 and bump stop 42.

Figure 7:
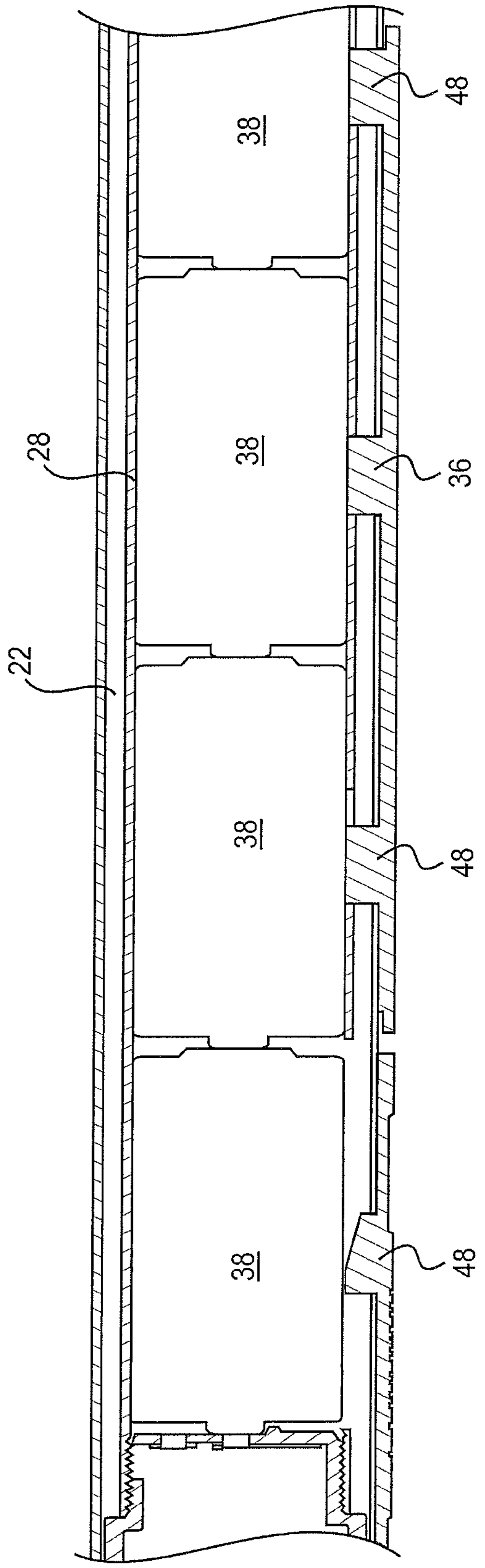
FIG. 7 is an enlarged cross-sectional view of the power assembly of the motorized shade according to an embodiment of the present invention.
Figure 8:
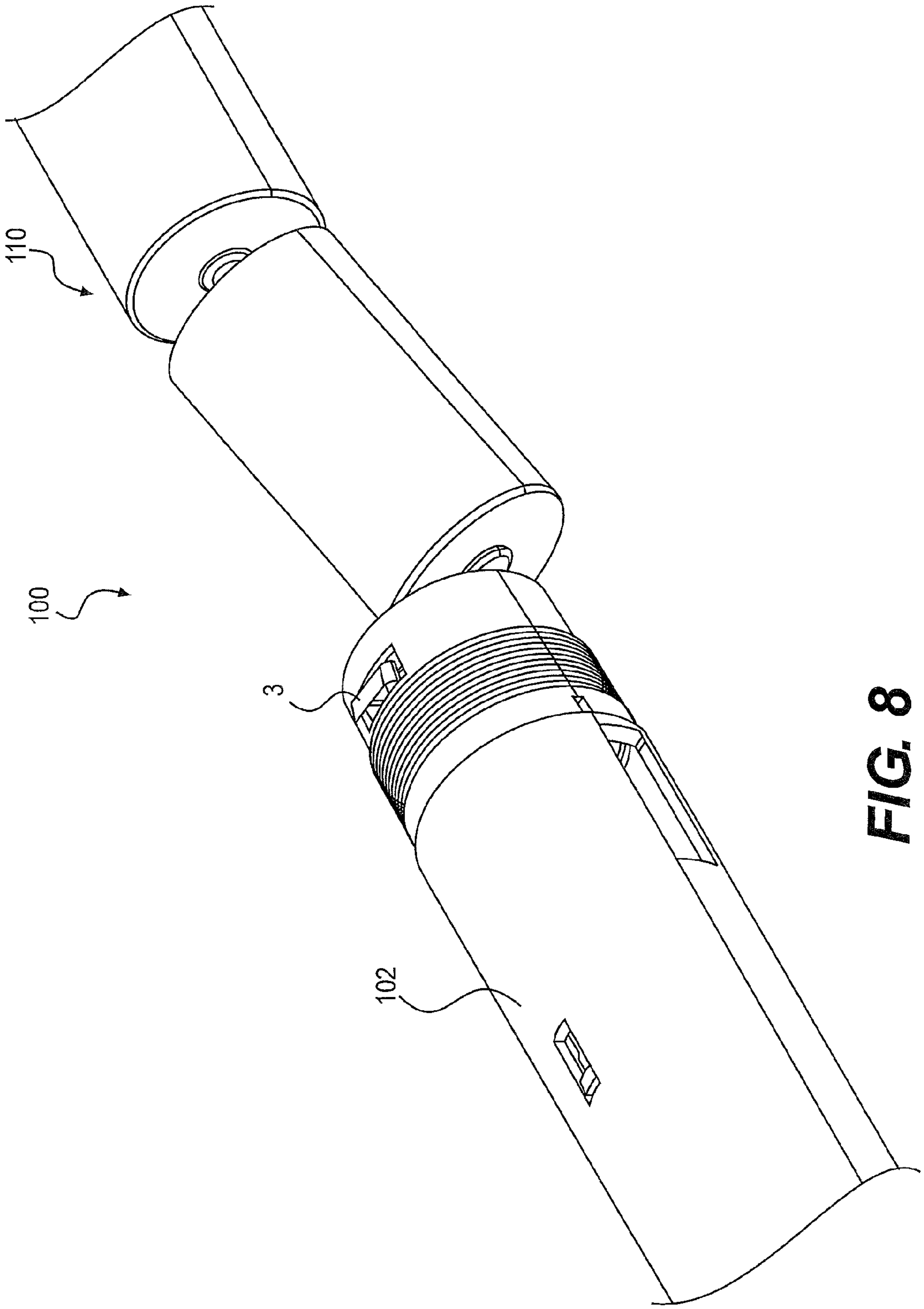
FIG. 8 is a perspective view of a motor housing and batters in accordance with an embodiment of the present invention.

Briefly turning to FIG. 7, a detailed cross-sectional view of the power source or battery sleeve 28 disposed within the tube assembly 22. While at least one battery 38 is depicted in the prior illustrations, the detailed embodiment depicted in FIG. 7 illustrates four (4) "D" sized batteries 38. In such embodiments, the batteries are housed, as previously mentioned, in a battery sleeve or conduit 28. As illustrated in FIGS. 2-5, the tube assembly 22 has an opening, access or port or slot 36 to that enables the end user to access the battery sleeve 28 and insert and remove batteries 38 from the sleeve 28 housed in the tube assembly 22. The aforementioned access door or slot 36 is exposed when the shade 12 of the motorized roller shade assembly 10 is fully deployed as illustrated in FIG. 2. As previously described, the port or slot 36 includes a sliding door 40 and bump stop 42. Also as previously described, the bump stop 42 includes the protrusions 48 that compress against the chambered batteries 38 within the battery sleeve 28, preventing the likelihood of the batteries 38 shifting position when the motorized roller shade assembly 10 is in operation. The bump stop may be constructed from a resiliently compressible material that enables the protrusions 48 to compress against the chambered batteries 38 within the battery 28, preventing the likelihood of the batteries 38 shifting position when the motorized roller shade assembly 10 is in operation. The protrusions 48 also function to provide an interference fit against the batteries 38, retaining them in place during loading and replacement of the batteries 38.

Figure 3:
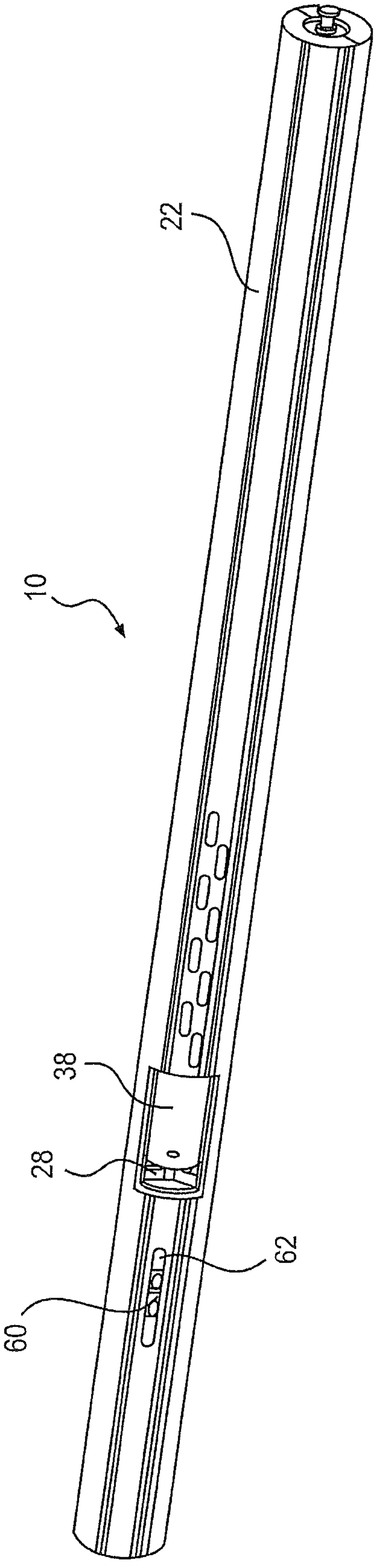
FIG. 3 is an isometric view of the motorized roller shade assembly depicted in FIG. 2, illustrating a sliding door in accordance with an embodiment of the present invention.
Figure 4:
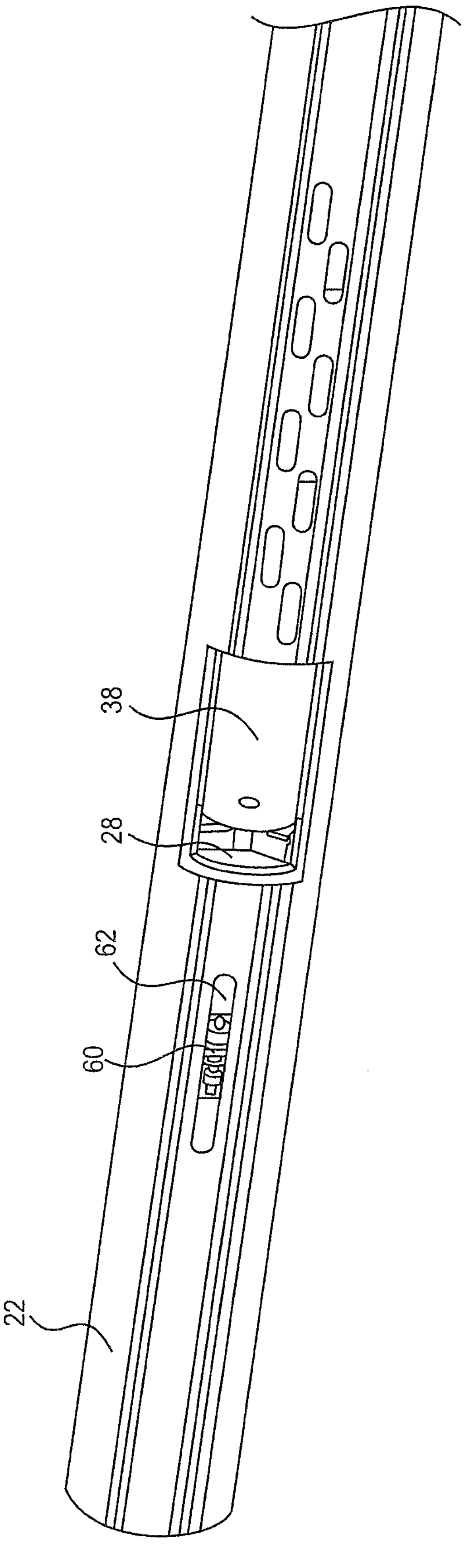
FIG. 4 is an isometric view of a motorized shade assembly depicting a sliding door in accordance with an embodiment of the present invention.
Figure 5:
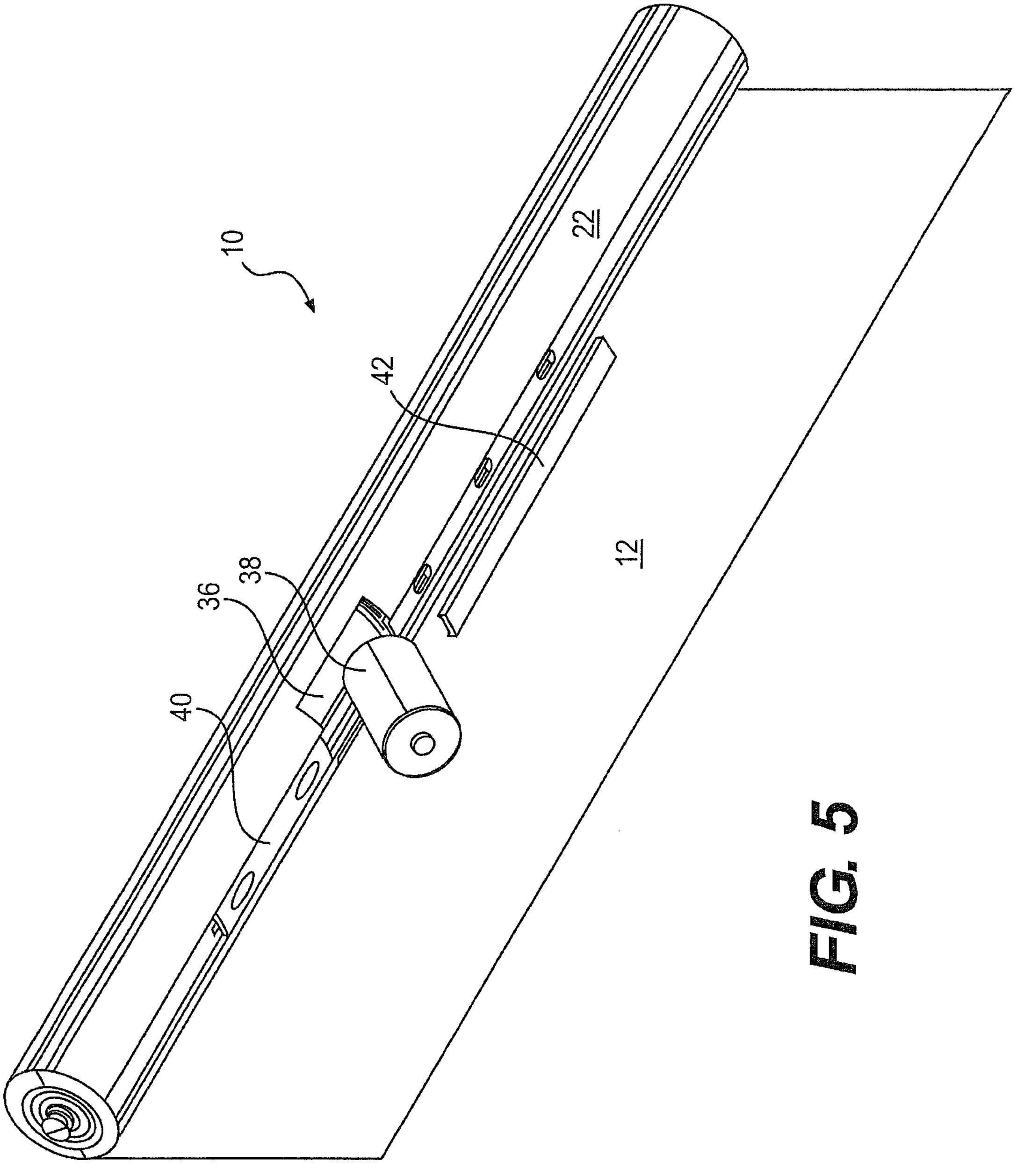
FIG. 5 is a section isometric view of the motorized shade assembly depicted in FIG. 4.

During operation, of the motorized roller shade assembly 10, the shade 12 must be fully deployed to access the sleeve 28 and batteries 38 as previously described. The batteries 38 can be loaded and removed via the port or slot 36 which can be partially covered by the door 40. The door 40 may be translated or moved to the open position as depicted in FIGS. 3-5 allowing for the removal and loading of batteries 38. Alternatively, the door 40 may be connected to the port via interference fit, friction fit, hinge, screw and/or any desired mechanical attachment means or method.

Turning specifically to FIGS. 3-6, an isometric view of the roller shade assembly 10, is depicted wherein the assembly 10 is in the open position. By open position it is understood that the door 40 is in the position such that the port 36 is exposed and the batteries 38 may be inserted or removed. In this open position, the battery 38 is positioned in the power unit 28, within the sleeve 22 and may be easily accessed for removal and replacement as illustrated in the figures.

Conversely, the door 40 may be translated in the opposite direction to the closed position, wherein the batteries 38 are positioned within the sleeve assembly and the motorized roller shade assembly 10 can operate. As previously mentioned, the sleeve door 40 has a stop 50 that correctly positions the last loaded battery 38 within the battery sleeve 28.

Turning to the bump stop 42, it is preferably constructed from a resiliently compressible material that enables the protrusions 48 to compress against the chambered batteries 38 within the battery 28, preventing the likelihood of the batteries 38 shifting position when the motorized roller shade assembly 10 is in operation. The protrusions 48 also function to provide an interference fit against the batteries 38, retaining them in place during loading and replacement of the batteries 38. When removing the batteries 38, the bump stop 42 is removed, as illustrated in FIGS. 5 and 6, allowing the batteries 38 to move freely enabling the tensioning spring 44 to push or eject the batteries from the power unit 28.

During the unloading of the batteries 38, door 40 is translated or moved to the position depicted in FIGS. 2 and 5. However, prior to the aforementioned translation, the bump stop 42 is removed. Next, the batteries 38 are removed. When loading the batteries 38, the bump stop 42 is replaced and the batteries 32 are loaded into tube assembly 22. The door 40 is then translated into the position depicted in FIG. 7.

Figure 6:
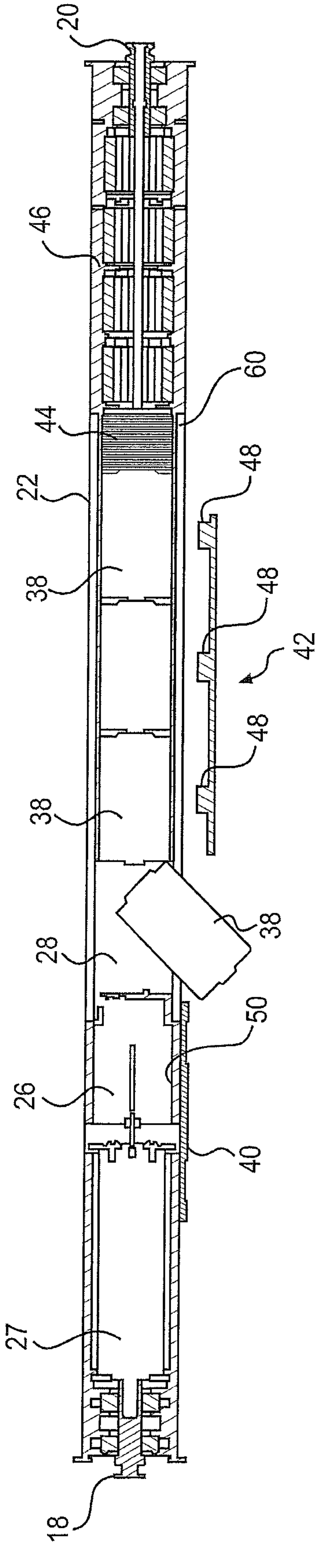
FIG. 6 is a schematic cross-sectional view of a motorized roller shade assembly, in accordance with an embodiment of the present invention.

Turning now to the internal components of the motorized roller shade assembly 10, as illustrated in FIG. 6 the assembly 10 generally comprises the motor unit 27 and controller system 26. The motor unit and controller system, in one embodiment, are preferably directly connected to the power conduit or battery sleeve 28 and include a circuit board housing, a DC gear motor which comprises a DC motor and an integral motor gear reducing assembly and a bearing housing. However, alternatively, the motor unit may include an electrical power connector, connecting the motor unit to the power unit. In such embodiments, the electrical power connector may include a terminal that couples to the power supply unit 28 and power cables that connect to the circuit board(s). The terminal may include positive and negative connectors that mate with cooperating positive and negative connectors of power supply unit 28, such as, for example, plug connectors, blade connectors, a coaxial connector, etc. The electrical power connector may be mechanically coupled to the inner surface of the tube assembly using a press fit, an interference fit, a friction fit, a key, adhesive, etc.

The aforementioned circuit boards generally include all of the supporting circuitry and electronic components necessary to sense and control the operation of the motor 27, manage and/or condition the power provided by the power supply unit 28, etc., including, for example, a controller or microcontroller, memory, a wireless receiver, etc.

In an embodiment encompassed by the present invention, an antenna for the wireless receiver may mounted to the circuit board. Alternatively, the antenna may be located outside the circuit board housing.

In another embodiment, a wireless transmitter is also provided, and information relating to the status, performance, etc., of the motorized roller shade 10 may be transmitted periodically to a wireless diagnostic device, or, preferably, in response to a specific query from the wireless diagnostic device.

Turing back to FIGS. 3 and 4, as illustrated the tube 22 includes one or more slots 62 to facilitate the transmission of wireless signal energy to the wireless receiver, and from the wireless transmitter, if so equipped. For example, if the wireless signal is within the radio frequency (RF) band, the slot may be advantageously matched to the wavelength of the signal. For example, for one RF embodiment, the slot is ⅛" wide and 2½" long however multiple dimensions may be utilized depending upon need or the end user's desire.

Turning now to one exemplary embodiment, the motor 27 is electrically connected to the circuit board, and has an output shaft that is connected to the input shaft of the motor gear reducing assembly 52. In various embodiments of the present invention, DC motor 50 and motor gear reducing assembly 46 are provided as a single mechanical package.

In preferred embodiments of the present invention, the rated voltage of the DC gear motor is much greater than the voltage produced by the batteries, by a factor of two or more, for example, causing the DC motor to operate at a reduced speed and torque rating, which advantageously eliminates undesirable higher frequency noise and draws lower current from the batteries, thereby improving battery life. In other words, applying a lower-than-rated voltage to the DC gear motor causes the motor to run at a lower-than-rated speed to produce quieter operation and longer battery life as compared to a DC gear motor running at its rated voltage, which draws similar amperage while producing lower run cycle times to produce equivalent mechanical power. In the embodiment described above, the 24V DC gear motor, running at lower voltages, enhances the cycle life of the battery operated roller shade by about 20% when compared to a 12V DC gear motor using the same battery stack.

Alternative embodiments encompassed by the present invention the motor and power assemblies are not internally housed as described above. For example, one or both of the motor assembly or battery/power source may be house external to the motorized shade assembly 10.

Turning now to FIGS. 8-12, an alternative embodiment of the present invention is depicted. Particularly, a motorized roller shade assembly 100 having a motor housing 102 comprising of two halves, 104 and 106. In the illustrated embodiment, the motorized roller shade assembly 100 includes the motor housing 102 which stores the motor 108, the battery chamber 110 and counter balance system 105.

Figure 9:
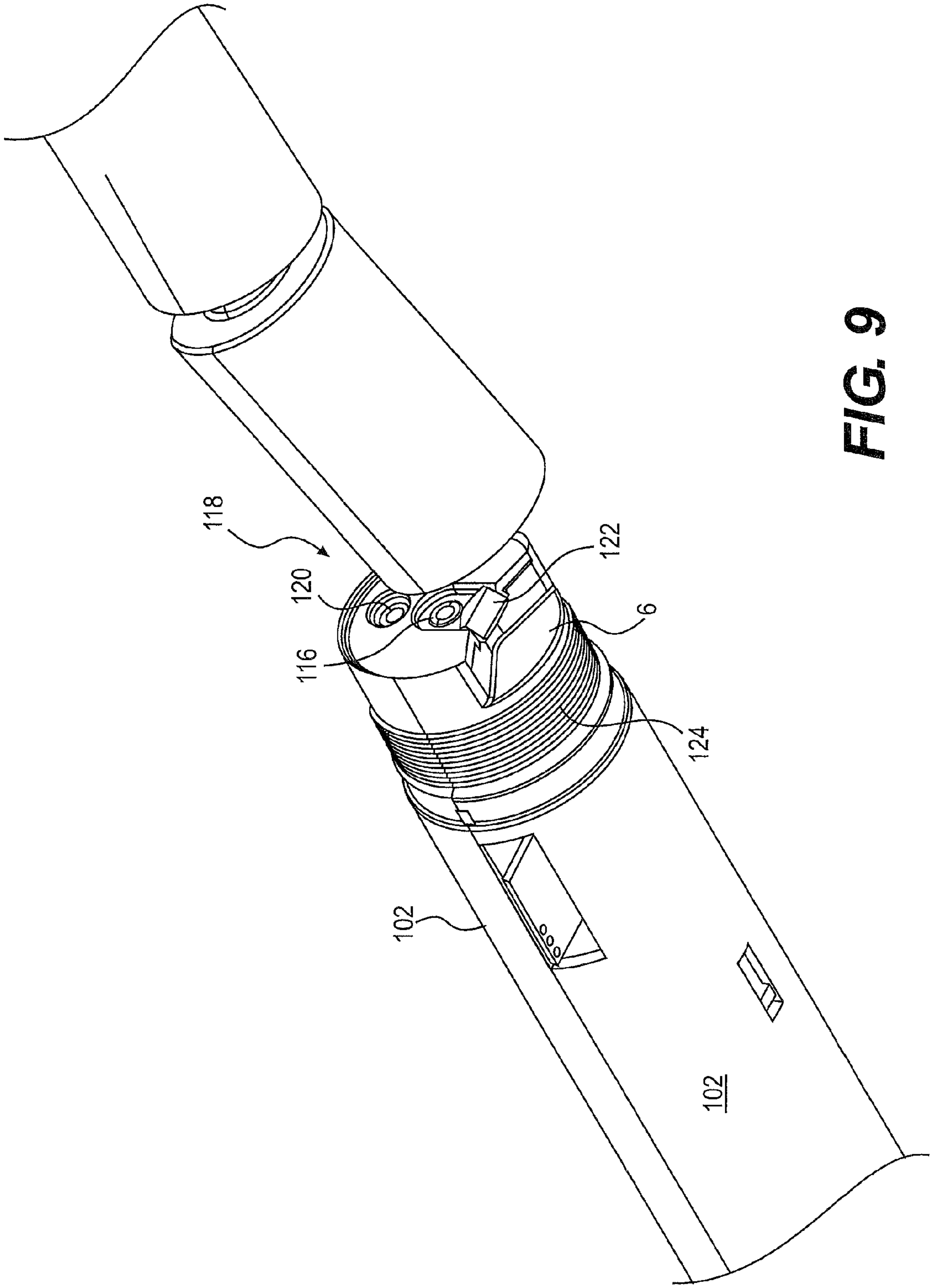
FIG. 9 is a reverse, bottom perspective view of the embodiment depicted in FIG. 8.
Figure 10:
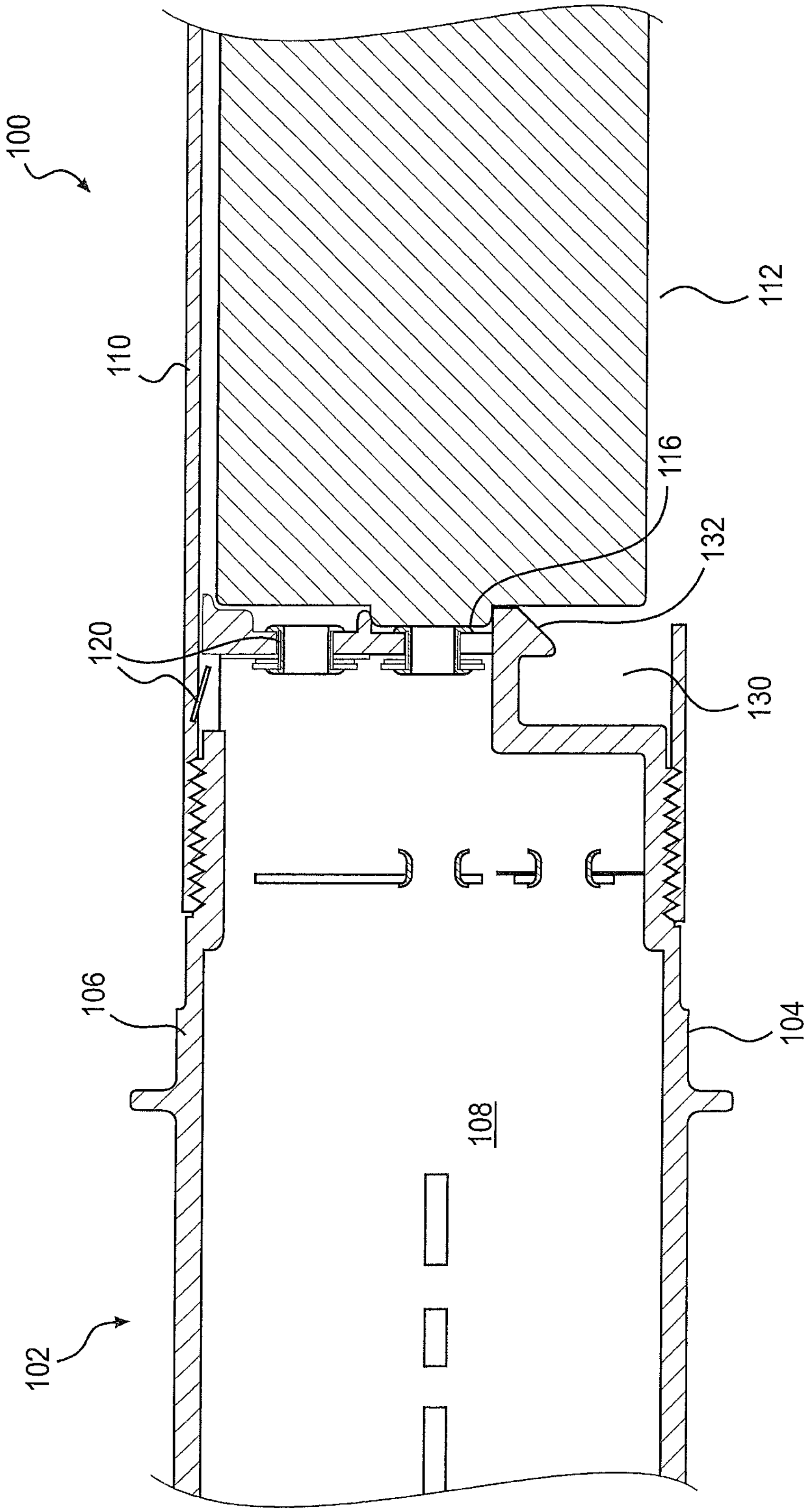
FIG. 10 is a sectional view of the electrical interface of the embodiment illustrated in FIGS. 8 and 9.
Figure 11:
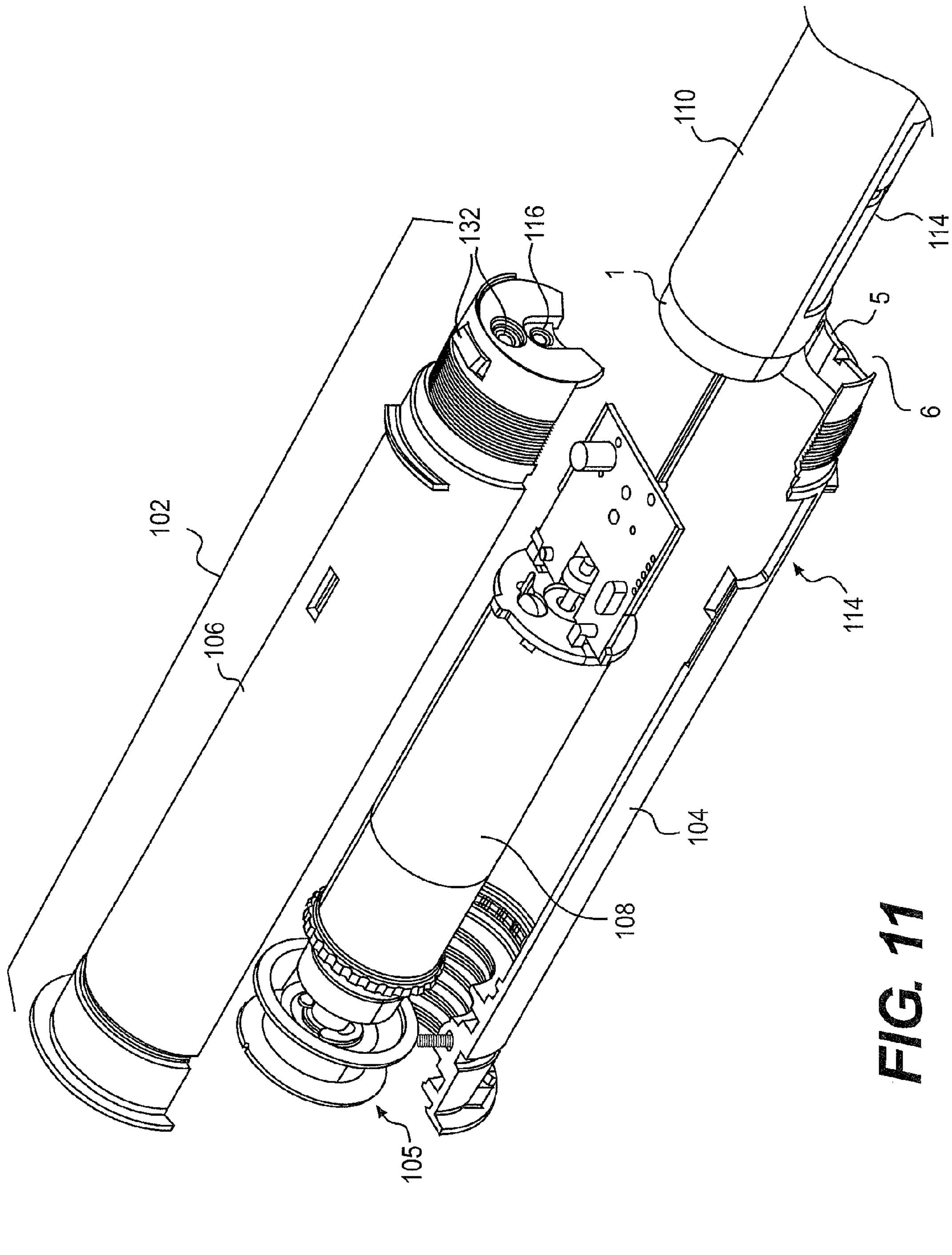
FIG. 11 is an exploded perspective view of the motor housing in accordance with an embodiment of the invention.
Figure 12:
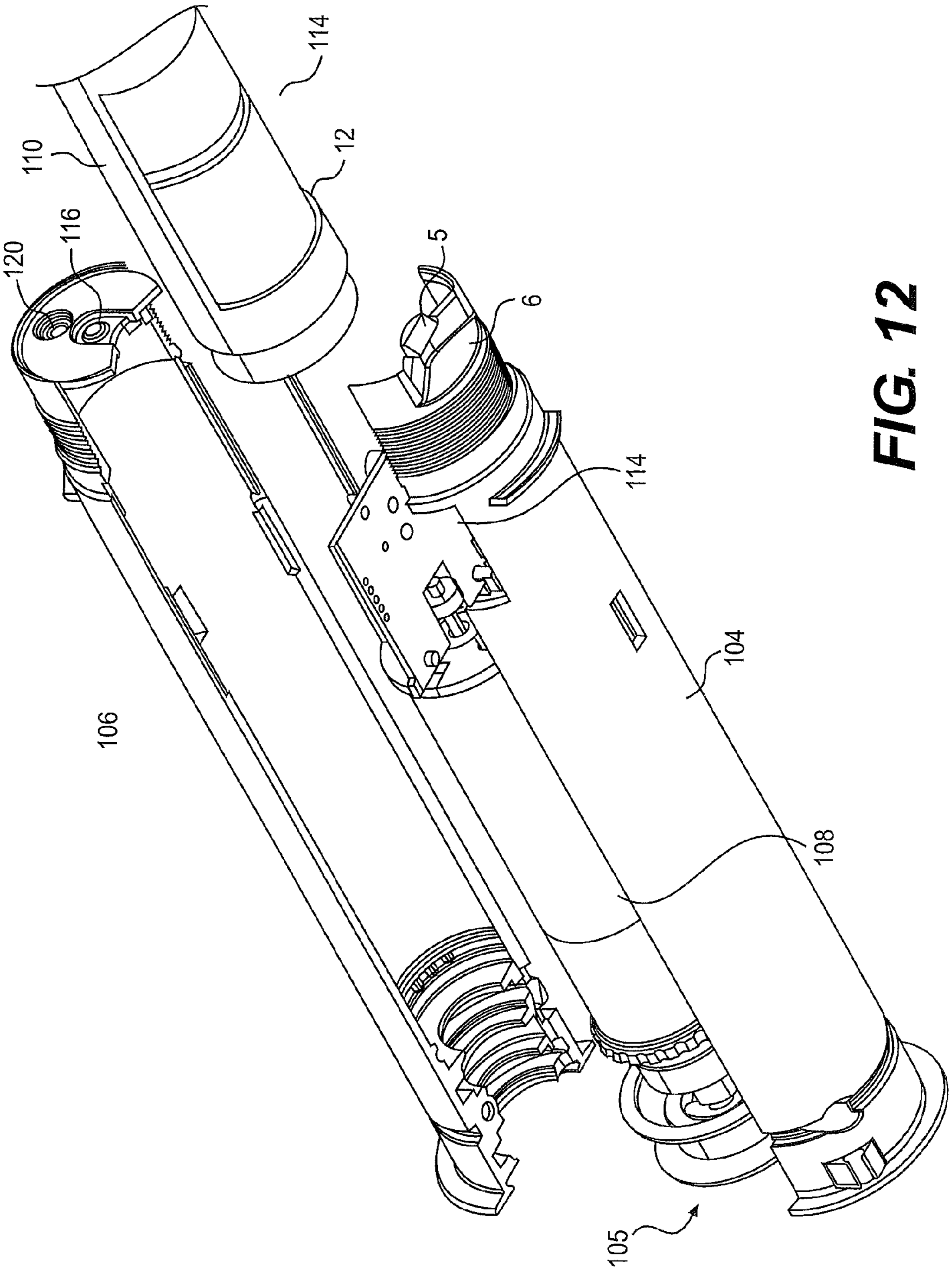
FIG. 12 is a lower perspective view of the motor housing depicted in FIG. 11.

Turning to FIGS. 9-11, the motorized roller shade assembly 100 comprises the motor housing 102 having the motor disposed therein which is adjacent the batter chamber 110. The battery chamber 110 houses preferably at least one battery 112 or the like. While one battery 112 may be utilized, the embodiment depicted utilizes four (4) "D" sized batteries. In such embodiments, the batteries are housed, as previously mentioned, in a battery chamber 110 (as illustrated in FIGS. 10-12). As illustrated in FIGS. 11 and 12, the chamber 110 has an opening, access or port 114 that enables the end user to access the battery chamber 110 and insert and remove batteries 112 from the chamber 110. The aforementioned slot 114 is exposed when the shade of the motorized roller shade assembly 100 is fully deployed as illustrated in figures. Alternatively, the motor and power assemblies may not be internally housed as described above. For example, one or both of the motor assembly or battery/power source may be housed external to the motorized shade assembly 100.

Briefly turning to FIG. 9, a detailed perspective view of the contact area 116 of the threaded cap 118 of the motor housing 102. The contact area 116 is provides the positive battery terminal 120 along with a retaining stop 122 for retaining the batteries 112. The threaded cap 118, as the name suggests, includes a threaded portion 124 that allows for the motor housing to securely engage and attach to the battery chamber. The cap 118, a previously mentioned includes a retaining stop 122 to hold the batters 112 in place with the assistance of an axial spring (not pictured) disposed in the battery chamber. As illustrated in FIGS. 11 and 12, the battery chamber 110 has an opening, access or port or slot 114 which enables the end user to access the batteries 112, and to insert and remove batteries 112 from the chamber 110 housed in the roller assembly 100.

Turning specifically to FIGS. 10-12, a sectional view of the components of the shade assembly 100 illustrating the motor housing 102 comprising halves, 104 and 106 and the battery chamber 110. Specifically, referring to FIG. 10, a sectional view of the components comprising the motor housing 102 having its separate halves 104 and 106 and the battery chamber 110 is illustrated. FIG. 10 also depicts a battery lead area 130, the retaining stop 122, the positive terminal 116 and the negative terminal 120. As previously discussed, the retaining stop 122, as the name suggests, retains the batteries 112 when inserted into the battery chamber 110.

Turning now specifically to FIGS. 11 and 12, an exploded view of the motorized roller shade assembly 100 having a motor housing 102 comprising of two halves, 104 and 106 is illustrated. In the illustrated embodiment, the motorized roller shade assembly 100 includes the motor housing 102 which stores the motor 108, the battery chamber 110 and counter balance system 112. As illustrated, the shade assembly 100 comprises the motor housing 102 having the motor disposed therein which is adjacent the battery chamber 110. The battery chamber 110 houses preferably at least one battery 112 or the like. While one battery 112 may be utilized, the embodiment depicted utilizes four (4) "D" sized batteries. As illustrated in FIGS. 11 and 12 the chamber 110 has an opening, access or port 114 that enables the end user to access the battery chamber 110 and insert and remove batteries 112 from the chamber 110. The aforementioned slot 114 is exposed when the shade of the motorized roller shade assembly 100 is fully deployed as illustrated in figures. While FIG. 11 depicts an upper exploded view, FIG. 12 depicts a lower exploded view.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A motorized roller shade, comprising:

a shade conduit having an outer surface upon which a shade is attached and an inner surface defining an inner cavity, the shade conduit and shade forming a roller shade;

a motor disposed within said inner cavity, said motor unit drives said shade conduit;

a controller that controls said motor;

a power supply chamber having an interior cavity, wherein said power supply chamber is disposed within said inner cavity, wherein said power supply chamber powers said motor; and an access port that extends between said outer surface and said inner surface, wherein said access port provides access to said interior space of said power supply chamber.

2. The motorized roller shade according to claim 1, wherein said shade conduit comprises a first shell and a second shell.

3. The motorized roller shade according to claim 1, further comprising a contact area that couples the motor to the power supply.

4. The motorized roller shade according to claim 3, wherein said contact area further comprises a positive terminal.

5. The motorized roller shade according to claim 3, wherein said contact area comprises a retaining stop.

6. The motorized roller shade according to claim 1, wherein the controller includes a wireless receiver that receives wireless signals.

7. The motorized roller shade according to claim 1, wherein the controller includes a wireless transmitter that send wireless signals.

8. The motorized roller shade according to claim 1, wherein the power chamber comprises a battery tube, electrically coupled to the motor and the controller, that houses at least one battery.

9. The motorized roller shade according to claim 8, wherein at least one battery further comprises four batteries.

10. The motorized roller shade according to claim 8, wherein said at least one battery is a "D" cell battery.

11. A motorized roller shade, comprising:

a shade conduit having an outer surface upon which a shade is attached and an inner surface defining an inner cavity, the shade conduit and shade forming a roller shade;

a motor disposed within said inner cavity, said motor unit drives said shade conduit;

a controller that controls said motor;

a power supply sleeve having an interior space, wherein said power supply sleeve is disposed within said inner cavity, wherein said power supply sleeve powers said motor;

an access port that extends between said outer surface and said inner surface, wherein said access port provides access to said interior space of said power supply sleeve; and an access door that provides access to said access port.

12. The motorized roller shade according to claim 11, wherein said access door translates between a first position, that covers said access port, and a second position that exposes said access port.

13. The motorized roller shade according to claim 11, wherein said access door is removably attached to said access port via mechanically attachment.

14. The motorized roller shade according to claim 11, wherein said access door is removably attached to said access port via bolt attachment.

15. The motorized roller shade according to claim 11, wherein the controller includes a wireless receiver that receives wireless signals.

16. An internal power unit for a motorized roller shade that is accessible when the motorized roller shade installed for use, comprising:

a power supply sleeve having and outer surface and an inner surface that define an interior space, wherein said power supply sleeve is disposed within a shade conduit of the motorized roller shade; and an access port that extends between said outer surface and said inner surface, wherein said access port provides access to said interior space of said power supply sleeve.

17. The internal power unit according to claim 16, further comprising a door that enables the access port to be opened or closed.

18. The internal power unit according to claim 17, wherein said door translates between a first position, that covers said access port, and a second position that exposes said access port.

19. The internal power unit according to claim 16, the controller includes a wireless receiver that receives wireless signals.

20. A motorized roller shade, comprising:

a shade conduit having an outer surface upon which a shade is attached and an inner surface defining an inner cavity, the shade conduit and shade forming a roller shade;

a motor disposed within said inner cavity, said motor unit drives said shade conduit;

a battery tube for housing at least one battery disposed in said inner cavity and coupled to said battery;

an access port that extends between said outer surface and said inner surface, that allows for said at least one battery to inserted or removed from said battery tube.

* * * * *